(12) United States Patent
Park et al.

(10) Patent No.: US 10,972,354 B1
(45) Date of Patent: Apr. 6, 2021

(54) WIRELESS COMMUNICATION BETWEEN A WIDE BANDWIDTH NETWORK NODE AND A NARROW BANDWIDTH WIRELESS DEVICE

(71) Applicant: Sprint Spectrum LP, Overland Park, KS (US)

(72) Inventors: Justin Sungki Park, Ashburn, VA (US); Saied Kazeminejad, Ashburn, VA (US); Durga Prasad Satapathy, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 32 days.

(21) Appl. No.: 16/571,651

(22) Filed: Sep. 16, 2019

(51) Int. Cl.
*H04L 12/24* (2006.01)
*H04W 72/12* (2009.01)
*H04L 1/18* (2006.01)

(52) U.S. Cl.
CPC ........ *H04L 41/0896* (2013.01); *H04L 1/1812* (2013.01); *H04W 72/1231* (2013.01)

(58) Field of Classification Search
CPC .......................... H04L 41/0896; H04L 1/1812
USPC ....................................................... 370/254
See application file for complete search history.

(56) References Cited

U.S. PATENT DOCUMENTS

| | | | |
|---|---|---|---|
| 2018/0092081 A1 | 3/2018 | Chen et al. | |
| 2018/0279310 A1* | 9/2018 | Chen ................. | H04W 72/0453 |
| 2019/0229967 A1* | 7/2019 | Frank ................. | H04L 27/2605 |
| 2019/0280843 A1* | 9/2019 | Jeon ................... | H04W 72/0453 |
| 2019/0306861 A1* | 10/2019 | Li ....................... | H04L 5/0044 |
| 2019/0312713 A1* | 10/2019 | Yang ................... | H04L 5/0091 |
| 2019/0372696 A1* | 12/2019 | Park ..................... | H04J 11/005 |
| 2020/0092044 A1* | 3/2020 | Park ..................... | H04W 28/04 |
| 2020/0100247 A1* | 3/2020 | Zhang .................. | H04L 5/0098 |
| 2020/0106592 A1* | 4/2020 | Soriaga ................ | H04L 5/001 |
| 2020/0107345 A1* | 4/2020 | Ang ..................... | H04L 5/001 |
| 2020/0177334 A1* | 6/2020 | Song .................... | H04L 5/0048 |
| 2020/0187093 A1* | 6/2020 | Awad .................. | H04W 72/005 |
| 2020/0344761 A1* | 10/2020 | Amuru ................. | H04L 5/0007 |
| 2020/0367288 A1* | 11/2020 | Dahlman ............ | H04W 74/0833 |
| 2020/0383103 A1* | 12/2020 | Zhou ................... | H04L 5/001 |

FOREIGN PATENT DOCUMENTS

| | | |
|---|---|---|
| WO | 2017/183926 A1 | 10/2017 |
| WO | 2017/213433 A1 | 12/2017 |
| WO | 2018/063845 A1 | 4/2018 |

* cited by examiner

*Primary Examiner* — Peter G Solinsky (57) ABSTRACT

Systems for wireless communication between a wide bandwidth network node and a narrow bandwidth wireless device are configured to perform operations including determining a maximum channel bandwidth of the narrow bandwidth wireless device, configuring at least two bandwidth parts (BWPs) within a single carrier deployed by the wide bandwidth network node, scheduling a data transmission between the wide bandwidth network node and the narrow bandwidth wireless device within the at least two BWPs, and instructing the narrow bandwidth wireless device to aggregate the at least two BWPs within the single carrier to receive the data transmission.

20 Claims, 5 Drawing Sheets

WIRELESS COMMUNICATION BETWEEN A WIDE BANDWIDTH NETWORK NODE AND A NARROW BANDWIDTH WIRELESS DEVICE

TECHNICAL BACKGROUND

As wireless networks evolve and grow, there are ongoing challenges in communicating data across such wireless networks. For example, a wireless network may include one or more access nodes, such as base stations, for providing wireless voice and data service to wireless devices in various coverage areas of the one or more access nodes. Further, access nodes may deploy radio air interfaces using one or more frequency bands or sub-bands, which enable wireless devices to connect (or "attach") to each access node. However, a bandwidth of an access node (i.e. a range of frequencies over which the access node is capable of utilizing for wireless communication) may be greater than a bandwidth of a wireless device (i.e. a range of frequencies over which the wireless device is capable of utilizing for wireless communication). For example, if an access node is capable of deploying a 200 MHz channel (as is common in 5G networks), a wireless device may only be able to communicate via channels comprising a maximum bandwidth of 100 MHz. Such an access node may hereinafter be referred to as a wide bandwidth network node, and such a wireless device may hereinafter be referred to as a narrow bandwidth wireless device.

Further complicating this problem is the possibility that the access node is not authorized to utilize the entire bandwidth of a frequency band. For example, certain portions of a frequency band may be available for wireless communication within a specific wireless network. However, configuring an access node to utilize these certain portions still results in narrow bandwidth wireless devices being unable to communicate with such access nodes.

OVERVIEW

Exemplary embodiments described herein include methods, systems, and processing nodes for wireless communication between a wide bandwidth network node and a narrow bandwidth wireless device. An exemplary method comprises determining a maximum channel bandwidth of the narrow bandwidth wireless device, wherein the maximum channel bandwidth is smaller than a default channel bandwidth of the wide bandwidth network node, configuring at least two bandwidth parts (BWPs) within the default channel bandwidth, wherein a total bandwidth of the at least two BWPs is less than or equal to the maximum channel bandwidth of the narrow bandwidth wireless device, and scheduling a data transmission between the wide bandwidth network node and the narrow bandwidth wireless device within the at least two BWPs, wherein the narrow bandwidth wireless device is configured to aggregate the at least two BWPs to receive the data transmission An exemplary system for wireless communication between a wide bandwidth network node and a narrow bandwidth wireless device includes a processing node; and a processor coupled to the processing node, the processor for configuring the processing node to perform operations comprising determining a maximum channel bandwidth of the narrow bandwidth wireless device, wherein the maximum channel bandwidth is smaller than a default channel bandwidth of the wide bandwidth network node, configuring at least two bandwidth parts (BWPs) within a single carrier deployed by the wide bandwidth network node, scheduling a data transmission between the wide bandwidth network node and the narrow bandwidth wireless device within the at least two BWPs, and instructing the narrow bandwidth wireless device to aggregate the at least two BWPs within the single carrier to receive the data transmission.

An exemplary processing node for wireless communication between a wide bandwidth network node and a narrow bandwidth wireless device is configured to perform operations comprising determining a maximum channel bandwidth of the narrow bandwidth wireless device, wherein the maximum channel bandwidth is smaller than a default channel bandwidth of the wide bandwidth network node, configuring at least two bandwidth parts (BWPs) within the default channel bandwidth, wherein a total bandwidth of the at least two BWPs is less than or equal to the maximum channel bandwidth of the narrow bandwidth wireless device, and scheduling a data transmission between the wide bandwidth network node and the narrow bandwidth wireless device within the at least two BWPs, wherein the narrow bandwidth wireless device is configured to aggregate the at least two BWPs to receive the data transmission.

DETAILED DESCRIPTION

In embodiments disclosed herein, wireless communication between a wide bandwidth network node and a narrow bandwidth wireless device includes determining a maximum channel bandwidth of the narrow bandwidth wireless device, wherein the maximum channel bandwidth is smaller than a default channel bandwidth of the wide bandwidth network node, configuring at least two bandwidth parts (BWPs) within the default channel bandwidth, wherein a total bandwidth of the at least two BWPs is less than or equal to the maximum channel bandwidth of the narrow bandwidth wireless device, and scheduling a data transmission between the wide bandwidth network node and the narrow bandwidth wireless device within the at least two BWPs, wherein the narrow bandwidth wireless device is configured to aggregate the at least two BWPs to receive the data transmission.

For example, a wide bandwidth network node, such as an access node, may be capable of utilizing a wide bandwidth but, as described above, may only be authorized to transmit data over portions of said wide bandwidth. Thus, portions of the wide bandwidth that the access node is not authorized to utilize may be muted, or otherwise unavailable for a data transmission between the wide bandwidth network node and the narrow bandwidth wireless device. Further, the narrow bandwidth wireless device attached to the wide bandwidth network node may be unable to communicate using the wide bandwidth. Therefore, configuring two or more BWPs in non-contiguous portions of the available bandwidth of the wide bandwidth network node and scheduling data transmissions in said two or more BWPs to the narrow bandwidth wireless device enables efficient use of the available spectrum. In other words, two or more non-contiguous BWPs can be configured to transmit data to the wireless device, while other portions of resources within the total channel bandwidth may be muted or reserved for other types of communication. Further, each BWP is configured with its own hybrid automatic repeat request (HARD) process, its own transport channel, and its own physical channel. In addition, the data transmission is scheduled via said transport channel and physical channel for each BWP at the same time.

Configuring the BWPs may be based on a device capability of one or more narrow bandwidth wireless devices attached to the wide bandwidth network node. The device capability may include a maximum channel bandwidth of the narrow bandwidth wireless device. The device capability may be requested by, for example, transmitting a capability request to the narrow bandwidth wireless device. For example, the wide bandwidth network node may transmit a request to one or more narrow bandwidth wireless devices attached thereto, the request comprising a request for a bandwidth capability of the narrow bandwidth wireless device. Based on the response received at the wide bandwidth network node from the narrow bandwidth wireless device, the wide bandwidth network node (or a processing node communicatively coupled thereto, as further described herein) may be configured to configure the at least two BWPs and schedule the data transmission as further described herein.

In an exemplary embodiment, the total channel bandwidth of the wide bandwidth network node may be 200 MHz, the maximum channel bandwidth of the narrow bandwidth wireless device may be 100 MHz, and any single contiguous portion of the total channel bandwidth comprises a bandwidth significantly less than 100 MHz. In this case, to maximize throughput, a data transmission from the wide bandwidth network node to the narrow bandwidth wireless device may be scheduled in two or more BWPs, each of which has a bandwidth of less than 100 MHz, and the two or more BWPs may be configured within a single carrier. For example, if the narrow bandwidth wireless device is attached to the wide bandwidth access node via a single component carrier having a 100 MHz bandwidth, then the narrow bandwidth wireless device is instructed to aggregate the two or more BWPs received via the single component carrier. The narrow bandwidth wireless device may further be instructed to aggregate the at least two BWPs at a medium access control (MAC) layer of the narrow bandwidth wireless device. Thus, an aggregate throughput of the at least two BWPs is equivalent to a throughput of a single channel having a bandwidth equivalent to the total bandwidth of the at least two BWPs, despite said single channel of the total bandwidth being unavailable for scheduling data transmission.

These operations may be enabled by further transmitting information associated with each BWP to the narrow bandwidth wireless device. For example, a radio resource control (RRC) identifying a numerology of each BWP may be transmitted via a control channel or other type of signaling mechanism between the wide bandwidth network node and the narrow bandwidth wireless device. This signaling further enables determination of the capabilities of the narrow bandwidth wireless device and data transmission thereto from the wide bandwidth network node. Further, these operations may be incorporated within a system or processing node in a wireless network. The processing node of the above-described system may be coupled to a wide bandwidth network node, such as a scheduler within an access node, a controller node, or any other network node capable of performing the muting and scheduling operations described herein. These and additional embodiments are further described with reference to FIGS. 1-5 below.

Figure 1:
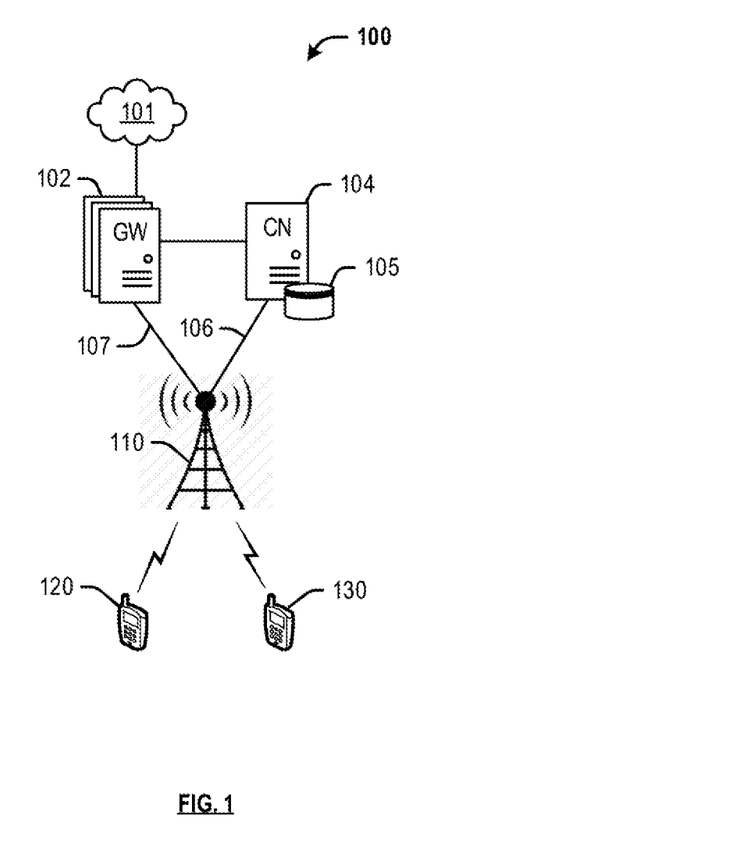
FIG. 1 depicts an exemplary system for wireless communication between a wide bandwidth network node and a narrow bandwidth wireless device.

FIG. 1 depicts an exemplary system 100 for wireless communication between wide bandwidth network node 110 and one or more narrow bandwidth wireless devices 120, 130. System 100 comprises a communication network 101, gateway 102, controller node 104, access node 110 (i.e. the wide bandwidth network node), and narrow bandwidth wireless devices 120, 130. Access node 110 can be any network node configured to provide communication between narrow bandwidth wireless devices 120, 130 and communication network 101, including standard access nodes and/or short range, low power, small access nodes. For instance, access node 110 may include any standard access node, such as a macrocell access node, base transceiver station, a radio base station, next generation or gigabit NodeBs (gNBs) in 5G networks, or enhanced eNodeBs (eNBs) in 4G/LTE networks, or the like. In other embodiments, access node 110 can be a small access node including a microcell access node, a picocell access node, a femtocell access node, or the like such as a home NodeB or a home eNodeB device. In either case, access node 110 can deploy one or more radio air interfaces that utilize one or more frequencies, enabling wireless communication with wireless devices 120, 130 over a coverage area. Further, for purposes of this disclosure, a narrow bandwidth wireless device is any wireless device or network node that has a maximum channel bandwidth that is smaller than a total channel bandwidth of a wide bandwidth network node. Further, although access node 110 and wireless devices 120, 130 are illustrated in FIG. 1, any number of access nodes and wireless devices can be implemented within system 100.

In an exemplary embodiment, access node 110 (or a processing node communicatively coupled thereto) can be configured to determine a maximum channel bandwidth of a narrow bandwidth wireless device 120, 130, wherein the maximum channel bandwidth is smaller than a default channel bandwidth of access node 110, configuring at least two bandwidth parts (BWPs) within the default channel bandwidth, wherein a total bandwidth of the at least two BWPs is less than or equal to the maximum channel bandwidth of the narrow bandwidth wireless device 120, 130, and scheduling a data transmission between access node 110 and the narrow bandwidth wireless device 120, 130 within the at least two BWPs, wherein the narrow bandwidth wireless device 120, 130 is configured to aggregate the at least two BWPs to receive the data transmission.

For example, access node 110 may be capable of utilizing a wide bandwidth but, as described above, may only be authorized to transmit data over portions of said wide bandwidth. Thus, portions of the wide bandwidth that the access node 110 is not authorized to utilize may be muted, or otherwise unavailable for a data transmission between the access node 110 and the narrow bandwidth wireless device 120, 130. Further, the narrow bandwidth wireless device 120, 130 attached to access node 110 may be unable to communicate using the wide bandwidth. Therefore, configuring two or more BWPs in non-contiguous portions of the available bandwidth of the access node 110 and scheduling data transmissions in said two or more BWPs to the narrow bandwidth wireless device 120, 130 enables efficient use of the available spectrum. In other words, two or more non-contiguous BWPs can be configured to transmit data to the wireless device 120, 130, while other portions of resources within the total channel bandwidth may be muted or reserved for other types of communication. Further, each BWP is configured with its own hybrid automatic repeat request (HARD) process, its own transport channel, and its own physical channel. In addition, the data transmission is scheduled via said transport channel and physical channel for each BWP at the same time.

Configuring the BWPs may be based on a device capability of one or more narrow bandwidth wireless devices 120, 130. The device capability may include a maximum channel bandwidth of the narrow bandwidth wireless device 120, 130. The device capability may be requested by, for example, transmitting a capability request to the narrow bandwidth wireless device 120, 130. For example, access node 110 may transmit a request to one or more narrow bandwidth wireless devices 120, 130 attached thereto, the request comprising a request for a bandwidth capability of the narrow bandwidth wireless device 120, 130. Based on the response received at the access node 110 from the narrow bandwidth wireless device 120, 130, the access node 110 (or a processing node communicatively coupled thereto, as further described herein) may be configured to configure the at least two BWPs and schedule the data transmission as further described herein.

In an exemplary embodiment, the total channel bandwidth of the access node 110 may be 200 MHz, the maximum channel bandwidth of the narrow bandwidth wireless device 120, 130 may be 100 MHz, and any single contiguous portion of the total channel bandwidth comprises a bandwidth significantly less than 100 MHz. In this case, to maximize throughput, a data transmission from the access node 110 to the narrow bandwidth wireless device 120, 130 may be scheduled in two or more BWPs, each of which has a bandwidth of less than 100 MHz, and the two or more BWPs may be configured within a single carrier. For example, if the narrow bandwidth wireless device 120, 130 is attached to the access node 110 via a single component carrier having a 100 MHz bandwidth, then the narrow bandwidth wireless device 120, 130 is instructed to aggregate the two or more BWPs received via the single component carrier. The narrow bandwidth wireless device 120, 130 may further be instructed to aggregate the at least two BWPs at a medium access control (MAC) layer of the narrow bandwidth wireless device 120, 130. Thus, an aggregate throughput of the at least two BWPs is equivalent to a throughput of a single channel having a bandwidth equivalent to the total bandwidth of the at least two BWPs, despite said single channel of the total bandwidth being unavailable for scheduling data transmission.

These operations may be enabled by further transmitting information associated with each BWP to the narrow bandwidth wireless device 120, 130. For example, a radio resource control (RRC) identifying a numerology of each BWP may be transmitted via a control channel or other type of signaling mechanism between the access node 110 and the narrow bandwidth wireless device 120, 130. This signaling further enables determination of the capabilities of the narrow bandwidth wireless device 120, 130 and data transmission thereto from the access node 110.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107. Access node 110 may communicate with each other and with other access nodes (not shown) using a direct link such as an X2 link or similar.

Wireless devices 120, 130 may be any device, system, combination of devices, or other such communication platform capable of communicating wirelessly with access node 110 using one or more frequency bands of a radio-air interface deployed therefrom. Wireless devices 120, 130 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 120, 130, etc. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, Ti, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), 5G NR, or combinations thereof. Communications links 106, 107 may include Si communications links. Other wireless protocols can also be used. Communication links 106, 107 can be a direct link or might include various equipment, intermediate components, systems, and networks. Communication links 106, 107 may comprise many different signals sharing the same link Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with, for example, setting up channels of different bandwidths between access node 110 and wireless devices 120, 130. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to access node 110 and wireless devices 120, 130 such as device capabilities, maximum bandwidths, etc. and communicate this information to access node 110 and/or wireless devices 120, 130 upon request. For example, this information may be requested by or shared with access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access node 110, controller node 104, and/or network 101.

Figure 2:
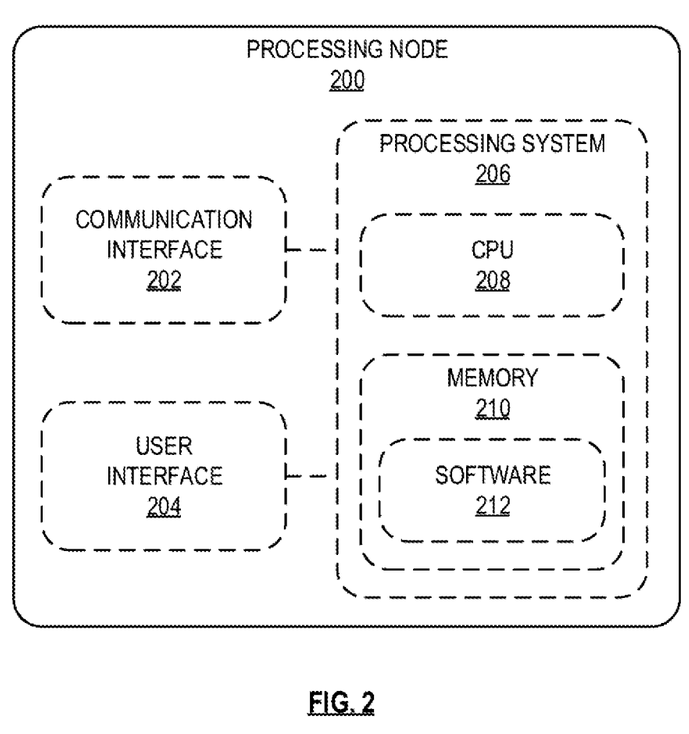
FIG. 2 depicts an exemplary processing node for wireless communication between a wide bandwidth network node and a narrow bandwidth wireless device.

FIG. 2 depicts an exemplary processing node 200 for wireless communication between a wide bandwidth network node and a narrow bandwidth wireless device. Processing node comprises a communication interface 202, user interface 204, and processing system 206 in communication with communication interface 202 and user interface 204. Processing system 206 includes a central processing unit (CPU) 208, and a memory 210, which can comprise a disk drive, flash drive, memory circuitry, or other memory device. Memory 210 can store software 212 which is used in the operation of the processing node 200. Software 212 may include computer programs, firmware, or some other form of machine-readable instructions, including an operating system, utilities, drivers, network interfaces, applications, or some other type of software. For example, software 212 may include an interference mitigation module comprising instructions for performing the operations described herein. Processing system 206 may include other circuitry to retrieve and execute software 212 from memory 210. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

In an exemplary embodiment, processing node 200 is configured to perform operations including determining a maximum channel bandwidth of a narrow bandwidth wireless device attached to a wide bandwidth network node, wherein the maximum channel bandwidth is smaller than a default channel bandwidth of the wide bandwidth network node, configuring at least two bandwidth parts (BWPs) within a single carrier deployed by the wide bandwidth network node, and scheduling a data transmission between the wide bandwidth network node and the narrow bandwidth wireless device within the at least two BWPs, and instructing the narrow bandwidth wireless device to aggregate the at least two BWPs within the single carrier to receive the data transmission.

In another exemplary embodiment, processing node 200 can be configured to perform operations including determining a maximum channel bandwidth of the narrow bandwidth wireless device, wherein the maximum channel bandwidth is smaller than a default channel bandwidth of the wide bandwidth network node, configuring at least two bandwidth parts (BWPs) within the default channel bandwidth, wherein a total bandwidth of the at least two BWPs is less than or equal to the maximum channel bandwidth of the narrow bandwidth wireless device, and scheduling a data transmission between the wide bandwidth network node and the narrow bandwidth wireless device within the at least two BWPs, wherein the narrow bandwidth wireless device is configured to aggregate the at least two BWPs to receive the data transmission.

Figure 3:
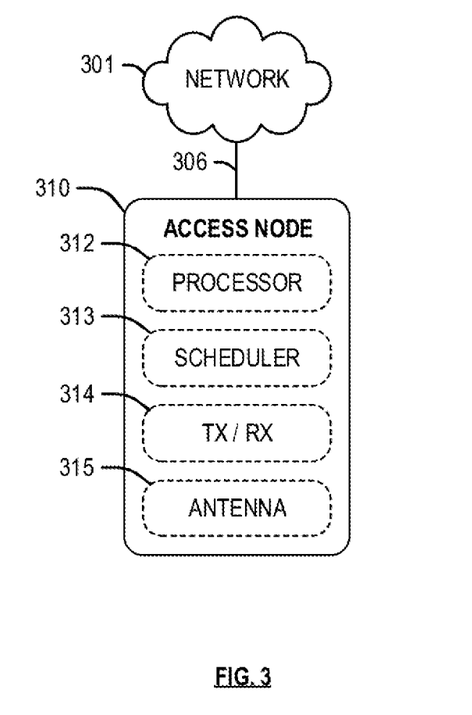
FIG. 3 depicts an exemplary access node.

FIG. 3 depicts an exemplary access node 310. Access node 310 may be a wide bandwidth access node, and is configured as an access point for providing network services from network 301 to end-user wireless devices via a radio-air interface deployed therefrom. Access node 310 is illustrated as comprising a processor 312, a scheduler 313 for performing the scheduling operations recited herein in conjunction with processor 312, a transceiver 314, and antenna 315 for deploying a radio air interface. One pair of transceivers and antennae are illustrated herein solely to simplify the written description, and it may be evident to those having ordinary skill in the art, that any combination of transceivers and antennae may be incorporated in order to deploy carriers of multiple frequencies, formed beams, MU-MIMO data streams, and/or to facilitate communication with other network nodes on network 301. Further, access node 310 is communicatively coupled to network 301 via communication interface 306, which may be any wired or wireless link as described above.

In an exemplary embodiment, access node 310 is configured to perform operations including determining a maximum channel bandwidth of the narrow bandwidth wireless device, wherein the maximum channel bandwidth is smaller than a default channel bandwidth of the access node 310, configuring at least two bandwidth parts (BWPs) within a single carrier deployed by the access node 310, scheduling a data transmission between the access node 310 and the narrow bandwidth wireless device within the at least two BWPs, and instructing the narrow bandwidth wireless device to aggregate the at least two BWPs within the single carrier to receive the data transmission.

Figure 4:
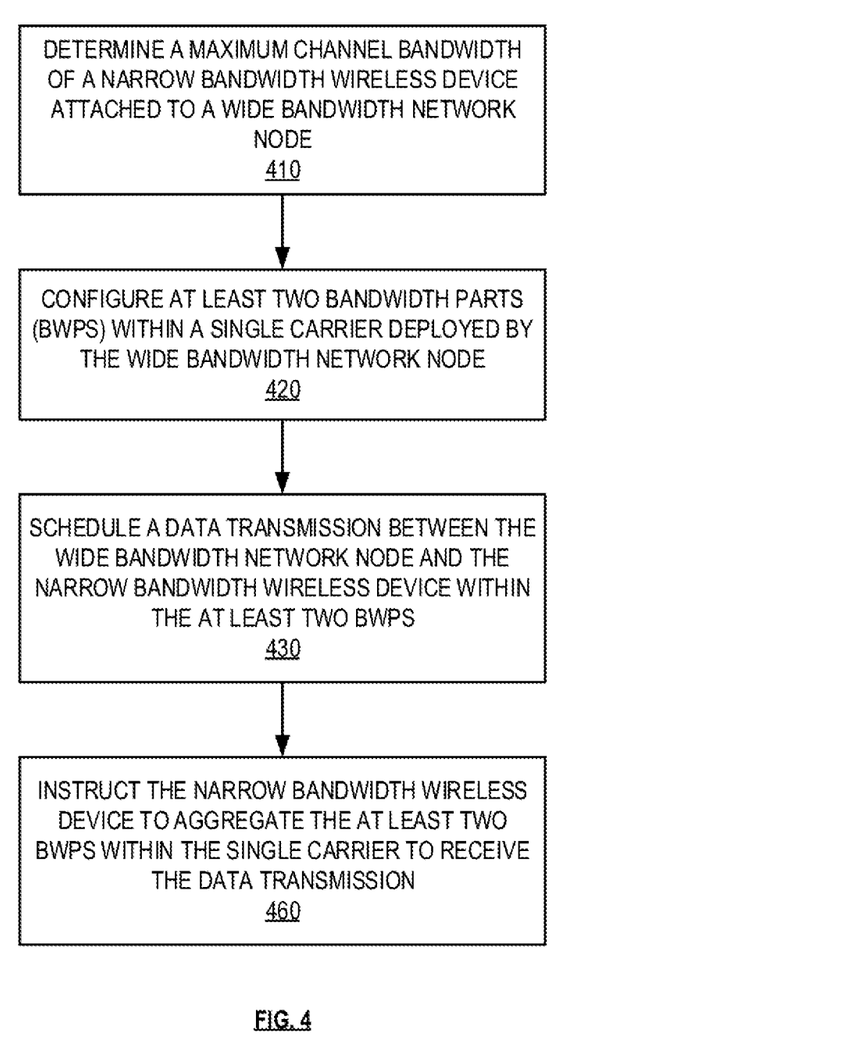
FIG. 4 depicts an exemplary method for wireless communication between a wide bandwidth network node and a narrow bandwidth wireless device.

FIG. 4 depicts an exemplary method for wireless communication between a wide bandwidth network node and a narrow bandwidth wireless device. The method of FIG. 4 is illustrated with respect to an access node, a controller node, or any other network node capable of performing the operations described herein. In other embodiments, the method can be implemented with any suitable network element. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 410, a maximum channel bandwidth of the narrow bandwidth wireless device attached to a wide bandwidth network node is determined. For example, a wide bandwidth network node, such as an access node, may be capable of utilizing a wide bandwidth but, as described above, may only be authorized to transmit data over portions of said wide bandwidth. Thus, portions of the wide bandwidth that the access node is not authorized to utilize may be muted, or otherwise unavailable for a data transmission between the wide bandwidth network node and the narrow bandwidth wireless device. Further, the narrow bandwidth wireless device attached to the wide bandwidth network node may be unable to communicate using the wide bandwidth. Therefore, configuring two or more BWPs in non-contiguous portions of the available bandwidth of the wide bandwidth network node at 420, and scheduling data transmissions in said two or more BWPs to the narrow bandwidth wireless device at 430, enables efficient use of the available spectrum. In other words, two or more non-contiguous BWPs can be configured to transmit data to the wireless device, while other portions of resources within the total channel bandwidth may be muted or reserved for other types of communication. Further, each BWP is configured with its own hybrid automatic repeat request (HARD) process, its own transport channel, and its own physical channel. In addition, the data transmission is scheduled via said transport channel and physical channel for each BWP at the same time.

Configuring the BWPs at 420 may be based on a device capability of one or more narrow bandwidth wireless devices attached to the wide bandwidth network node. The device capability may include a maximum channel bandwidth of the narrow bandwidth wireless device. The device capability may be requested at 410 by, for example, transmitting a capability request to the narrow bandwidth wireless device. For example, the wide bandwidth network node may transmit a request to one or more narrow bandwidth wireless devices attached thereto, the request comprising a request for a bandwidth capability of the narrow bandwidth wireless device. Based on the response received at the wide bandwidth network node from the narrow bandwidth wireless device, the wide bandwidth network node (or a processing node communicatively coupled thereto, as further described herein) may be configured to configure the at least two BWPs at 420 and schedule the data transmission at 430.

In an exemplary embodiment, the total channel bandwidth of the wide bandwidth network node may be 200 MHz, the maximum channel bandwidth of the narrow bandwidth wireless device may be 100 MHz, and any single contiguous portion of the total channel bandwidth comprises a bandwidth significantly less than 100 MHz. In this case, to maximize throughput, a data transmission scheduled at 430 from the wide bandwidth network node to the narrow bandwidth wireless device may be scheduled in two or more BWPs, each of which has a bandwidth of less than 100 MHz, and the two or more BWPs may be configured within a single carrier. For example, if the narrow bandwidth wireless device is attached to the wide bandwidth access node via a single component carrier having a 100 MHz bandwidth, then the narrow bandwidth wireless device is instructed to aggregate the two or more BWPs received via the single component carrier. The narrow bandwidth wireless device may further be instructed to aggregate the at least two BWPs at a medium access control (MAC) layer of the narrow bandwidth wireless device. Thus, an aggregate throughput of the at least two BWPs is equivalent to a throughput of a single channel having a bandwidth equivalent to the total bandwidth of the at least two BWPs, despite said single channel of the total bandwidth being unavailable for scheduling data transmission.

These operations may be enabled by further transmitting information associated with each BWP to the narrow bandwidth wireless device and, at 440, instructing the narrow bandwidth wireless device to aggregate the at least two BWPs within the single carrier to receive the data transmission. For example, a radio resource control (RRC) identifying a numerology of each BWP may be transmitted via a control channel or other type of signaling mechanism between the wide bandwidth network node and the narrow bandwidth wireless device. This signaling further enables determination of the capabilities of the narrow bandwidth wireless device and data transmission thereto from the wide bandwidth network node.

Figure 5:
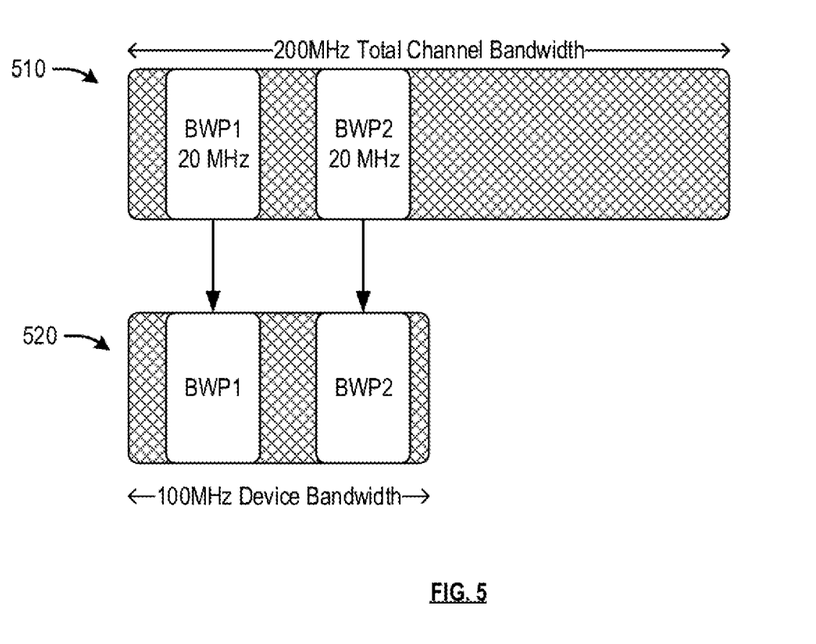
FIG. 5 depicts exemplary channels for wireless communication between a wide bandwidth network node and a narrow bandwidth wireless device.

This example is further illustrated with reference to FIG. 5. FIG. 5 depicts a total channel bandwidth 510 comprising 200 MHz, out of which the shaded portions are unusable (or otherwise unavailable). In this embodiment, the maximum channel bandwidth 520 of a narrow bandwidth wireless device may be 100 MHz, and any single contiguous portion of the total channel bandwidth 510 comprises a bandwidth significantly less than 100 MHz. In this case, to maximize throughput, a data transmission scheduled from the wide bandwidth network node to the narrow bandwidth wireless device may be scheduled in two or more BWPs, each of which is illustrated in total channel bandwidth as 20 MHz each. Further, the two or more BWPs may be configured within a single carrier. Since an aggregate bandwidth of the BWPs is 100 MHz, the two BWPs may be transmitted to the wireless device within a single carrier, such as a component carrier. Further, each BWP is configured with its own hybrid automatic repeat request (HARD) process, its own transport channel, and its own physical channel. In addition, the data transmission is scheduled via said transport channel and physical channel for each BWP at the same time. Moreover, the wireless device is instructed to aggregate the two BWPs received within the single component carrier. It will be noted by those having ordinary skill in the art that these bandwidths are merely exemplary, and other combinations of bandwidths and channels may be contemplated in light of this disclosure, based on the specific implementation of the disclosed methods into various telecommunications systems.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for wireless communication between a wide bandwidth network node and a narrow bandwidth wireless device, the method comprising:
    determining a maximum channel bandwidth of the narrow bandwidth wireless device, wherein the maximum channel bandwidth is smaller than a default channel bandwidth of the wide bandwidth network node;
    configuring at least two bandwidth parts (BWPs) within the default channel bandwidth, wherein a total bandwidth of the at least two BWPs is less than or equal to the maximum channel bandwidth of the narrow bandwidth wireless device;
    and
    scheduling a data transmission between the wide bandwidth network node and the narrow bandwidth wireless device within the at least two BWPs,
    wherein the narrow bandwidth wireless device is configured to aggregate the at least two BWPs to receive the data transmission.

2. The method of claim 1, wherein each BWP has its own hybrid automatic repeat request (HARD) process.

3. The method of claim 1, wherein each BWP has its own transport channel and physical channel.

4. The method of claim 3, wherein scheduling the data transmission further comprises scheduling said transport channel and physical channel for each BWP at the same time.

5. The method of claim 1, wherein configuring the at least two BWPs within the default channel bandwidth comprises configuring the at least two BWPs within a single carrier deployed by the wide bandwidth network node.

6. The method of claim 5, further comprising instructing the narrow bandwidth wireless device to aggregate the at least two BWPs within the single carrier.

7. The method of claim 6, further comprising instructing the narrow bandwidth wireless device to aggregate the at least two BWPs at a medium access control (MAC) layer of the narrow bandwidth wireless device.

8. The method of claim 5, wherein the single carrier comprises a component carrier.

9. The method of claim 1, wherein an aggregate throughput of the at least two BWPs is equivalent to a throughput of a single channel having a bandwidth equivalent to the total bandwidth of the at least two BWPs.

10. The method of claim 1, wherein determining the maximum channel bandwidth of the narrow bandwidth wireless device further comprises transmitting a capability request to the narrow bandwidth wireless device.

11. The method of claim 1, further comprising transmitting information associated with each BWP to the narrow bandwidth wireless device.

12. The method of claim 11, wherein the information comprises a numerology associated with each BWP.

13. The method of claim 1, wherein each BWP has its own hybrid automatic repeat request (HARD) process.

14. The method of claim 1, wherein each BWP has its own transport channel and physical channel.

15. A system for wireless communication between a wide bandwidth network node and a narrow bandwidth wireless device, the system comprising:

a processing node; and
a processor coupled to the processing node, the processor for configuring the processing node to perform operations comprising:
- determining a maximum channel bandwidth of the narrow bandwidth wireless device, wherein the maximum channel bandwidth is smaller than a default channel bandwidth of the wide bandwidth network node;
- configuring at least two bandwidth parts (BWPs) within a single carrier deployed by the wide bandwidth network node;
- scheduling a data transmission between the wide bandwidth network node and the narrow bandwidth wireless device within the at least two BWPs; and
- instructing the narrow bandwidth wireless device to aggregate the at least two BWPs within the single carrier to receive the data transmission.

16. The system of claim 15, wherein a total bandwidth of the at least two BWPs is less than or equal to the maximum channel bandwidth of the narrow bandwidth wireless device.

17. The system of claim 15, wherein an aggregate throughput of the at least two BWPs is equivalent to a throughput of a single channel having a bandwidth equivalent to the total bandwidth of the at least two BWPs.

18. A processing node for wireless communication between a wide bandwidth network node and a narrow bandwidth wireless device, the processing node being configured to perform operations comprising:
- determining a maximum channel bandwidth of the narrow bandwidth wireless device, wherein the maximum channel bandwidth is smaller than a default channel bandwidth of the wide bandwidth network node;
- configuring at least two bandwidth parts (BWPs) within the default channel bandwidth, wherein a total bandwidth of the at least two BWPs is less than or equal to the maximum channel bandwidth of the narrow bandwidth wireless device;
and
- scheduling a data transmission between the wide bandwidth network node and the narrow bandwidth wireless device within the at least two BWPs,
wherein the narrow bandwidth wireless device is configured to aggregate the at least two BWPs to receive the data transmission.

19. The processing node of claim 18, wherein each BWP has its own hybrid automatic repeat request (HARD) process, transport channel, and physical channel.

20. The processing node of claim 18, wherein the operations further comprise instructing the narrow bandwidth wireless device to receive the data transmission in the at least two BWPs via a single component carrier.

* * * * *